United States Patent [19]

Suttner

[11] Patent Number: 5,667,141

[45] Date of Patent: Sep. 16, 1997

[54] HIGH PRESSURE CLEANING MEANS

[75] Inventor: Wolfgang Suttner, Bielefeld, Germany

[73] Assignee: Elektra Beckum AG, Germany

[21] Appl. No.: 433,556

[22] Filed: May 3, 1995

[30] Foreign Application Priority Data

| May 3, 1994 | [DE] | Germany | 44 15 573.5 |
| Aug. 19, 1994 | [DE] | Germany | 44 30 591.5 |

[51] Int. Cl.$^6$ ........................................... B05B 9/04
[52] U.S. Cl. ........................... 239/332; 318/112; 318/113
[58] Field of Search ............................. 239/124, 332; 318/34, 49, 111, 112, 113; 417/351, 374

[56] References Cited

U.S. PATENT DOCUMENTS

| 1,313,079 | 8/1919 | Emmet | 318/112 X |
| 3,977,603 | 8/1976 | Magee, Jr. | 239/332 X |
| 5,100,058 | 3/1992 | Wei | 239/332 X |
| 5,230,471 | 7/1993 | Berfield | 239/124 |
| 5,374,877 | 12/1994 | Imaseki et al. | 318/34 |

OTHER PUBLICATIONS

Geschlossene Drehstrommotoren mit Oberflächenbelüftung, Nov. 1955, pp. 1–41.

*Primary Examiner*—Andres Kashnikow
*Assistant Examiner*—Steven J. Ganey
*Attorney, Agent, or Firm*—Sixbey, Friedman, Leedom & Ferguson, PC; David S. Safran

[57] ABSTRACT

A high pressure cleaning means is described with a preferably portable housing having a high pressure pump (6) and an electric motor drive (7) for the high pressure pump (6), the motor drive having an electric drive motor (8) with a drive shaft (9) connected to the high pressure pump (6). The motor drive (7) has at least a second electric drive motor (11) and the electric motors (8, 11, 12) of motor drive (7) are coupled to one another so as to drive the high pressure pump (6) jointly. The use of universal motors as the electric drive motors (8, 11, 12) is especially advantageous. The motor arrangement is also applicable to hand saws, water pumps, shredders, vacuums (wet/dry vacuums, leaf vacuums) and various other assemblies.

14 Claims, 4 Drawing Sheets

HIGH PRESSURE CLEANING MEANS

BACKGROUND OF THE INVENTION

1. Field of the Invention

The invention relates to a high pressure cleaning means with a preferably portable housing having a high pressure pump and having an electric motor drive means for the high pressure pump which has an electric drive motor that is connected to the high pressure pump by a drive shaft.

2. Description of Related Art

In high pressure cleaning means of the type to which the present invention is directed, so-called high pressure cleaners, the problem always arises that a high flow rate and high pump pressure with as little weight as possible are desired. At present, it is considered indisputable that a high pressure cleaner that operates with a pressure of 150 bar and flow rate of 10 liters/minute weighs roughly 20 kg. While, by the improvement of pump engineering and by optimized channel routing, as well as by using modern plastic composites, it has been possible to achieve weights under 10 kg in high pressure cleaners which operate in low pressure ranges up to roughly 90 bar with lower delivery volumes, high pressure cleaners of the first-mentioned strength are very heavy devices, as in the past. Efforts are being made to make these high pressure cleaners transportable, in part with axles integrated in the housing.

Otherwise, small pump size, a price as favorable as possible, and also versatility in different geographical regions are important aspects for a high pressure cleaning means or other assemblies with the corresponding electric drives.

SUMMARY OF THE INVENTION

Therefore, a primary object of the present invention is to devise a high pressure cleaning means with high performance, or another corresponding assembly, which has a low weight, a size as small as possible, a price as favorable as possible, and great versatility.

The aforementioned object is attained, in a high pressure cleaning means with a preferably portable housing having a high pressure pump and having an electric motor drive means for the high pressure pump which has an electric drive motor that is connected to the high pressure pump by a drive shaft, by providing the drive means with at least a second electric drive motor and by jointly coupling all electric motors of the drive means to one another and the high pressure pump.

A tandem electric motor or a trio-electric motor in an assembly of high driving force, such as in a high pressure pump, at the same pumping capacity, yields major advantages relative to an individual, correspondingly larger electric motor. Of course, the number of motors to be coupled to one another cannot be arbitrarily increased without losing the advantage of the concept according to the invention. According to current findings, two, or a maximum of three, motors are optimum. Three motors, moreover, have the advantage that, with a three phase current power supply of 380 V connected in a star or triangle, they can each be operated with 220 V. But, also a tandem arrangement with two electric motors has major advantages. This applies to costs, size, versatility and starting current. Of course, which drive-engineering concept is used also depends on the motor design.

The simplest concept is to directly couple the drive shafts of the electric motors to one another, i.e., to connect the electric motors in series behind one another. Thus, all of the electric motors work via the drive shaft of the frontmost electric motor or essentially through an effective drive shaft on the high pressure pump, optionally, with the interposition of a reducing gear.

It is also possible to proceed similarly when a transmission, such as a toothed belt, is provided coupling the drive shafts of the electric motors together, and at the same time, however, only one drive shaft of an electric motor is used for transmitting power to the high pressure pump.

A design using a common transmission is especially interesting. In this case, for example, a symmetrical concentration of the drive forces of all electric motors can also be achieved via a central transmission, such as a toothed gearing, especially a planetary gear arrangement.

An especially important arrangement involves the use of electric motors in the form of universal motors (collector motors or commutator series motors for direct or alternating current) which optimize the concept according to the present invention in a quite surprising manner. Not only is the optimum price-performance ratio achieved, here, but also weight and size are optimized. In addition, universal motors with different operating currents can be used since the rpm can be very easily controlled. It is also of great importance that the frequency of the alternating current (50 Hz, 60 Hz) plays no part. Therefore, the combination of the multimotor concept of the invention with the use of universal motors is of special importance.

These and further objects, features and advantages of the present invention will become apparent from the following description when taken in connection with the accompanying drawings which, for purposes of illustration only, show several embodiments in accordance with the present invention.

DETAILED DESCRIPTION OF THE PREFERRED EMBODIMENTS

Figure 1:
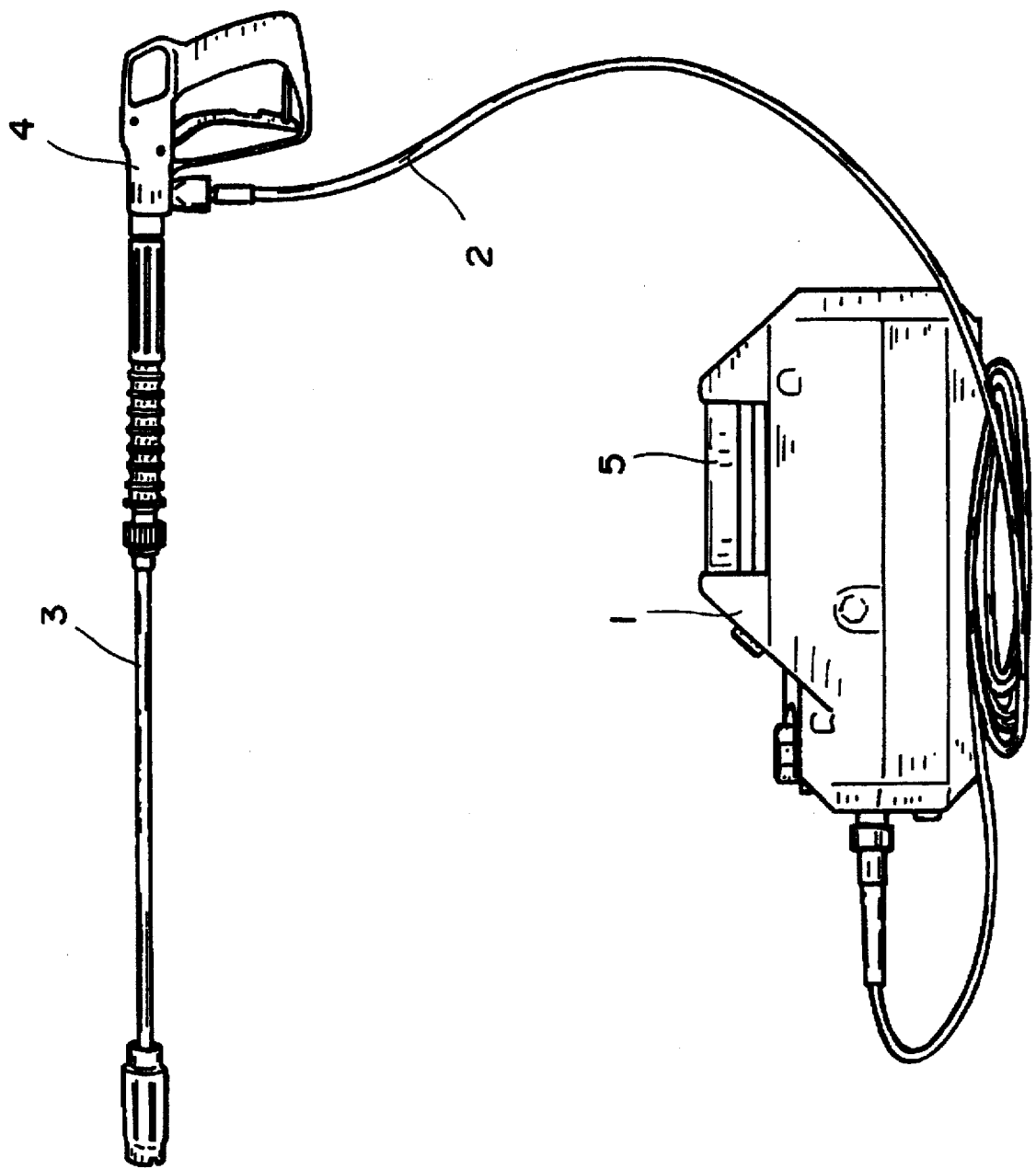
FIG. 1 shows a high pressure cleaning means in a general representation of a primary application example of the invention.

The high pressure cleaning means shown in FIG. 1, as is conventional, has a housing 1 from which a high pressure hose 2 leads to a high pressure lance 3. Spraying of a water jet from the lance 3 is controlled by means of a conventional valve pistol 4. Such a high pressure cleaning means (commonly referred to as high pressure cleaners) are extensively used both commercially and privately. These high pressure cleaners are used for cleaning motor vehicles, floor plates, facings, and even for sand blasting with the corresponding attachments.

The housing 1 shown in FIG. 1 has a handle 5 with which it can be carried. The teaching of the present invention is concerned with the weight of a high pressure cleaning means of this type. The weight of the high pressure cleaning means, of course, should not be too great, otherwise portability becomes impractical. A weight as low as possible with performance as high as possible, therefore pump pressure as high as possible and comparatively high flow rate, are desirable. With the teaching of the invention it is possible to build a high pressure cleaner with a pump capacity of 150 bar and a flow rate of roughly 10 liters per minute with a weight of less than 10 kg. This is all still possible with a price which is at least 30 to 40% less than the current price of comparable devices.

Figure 2:
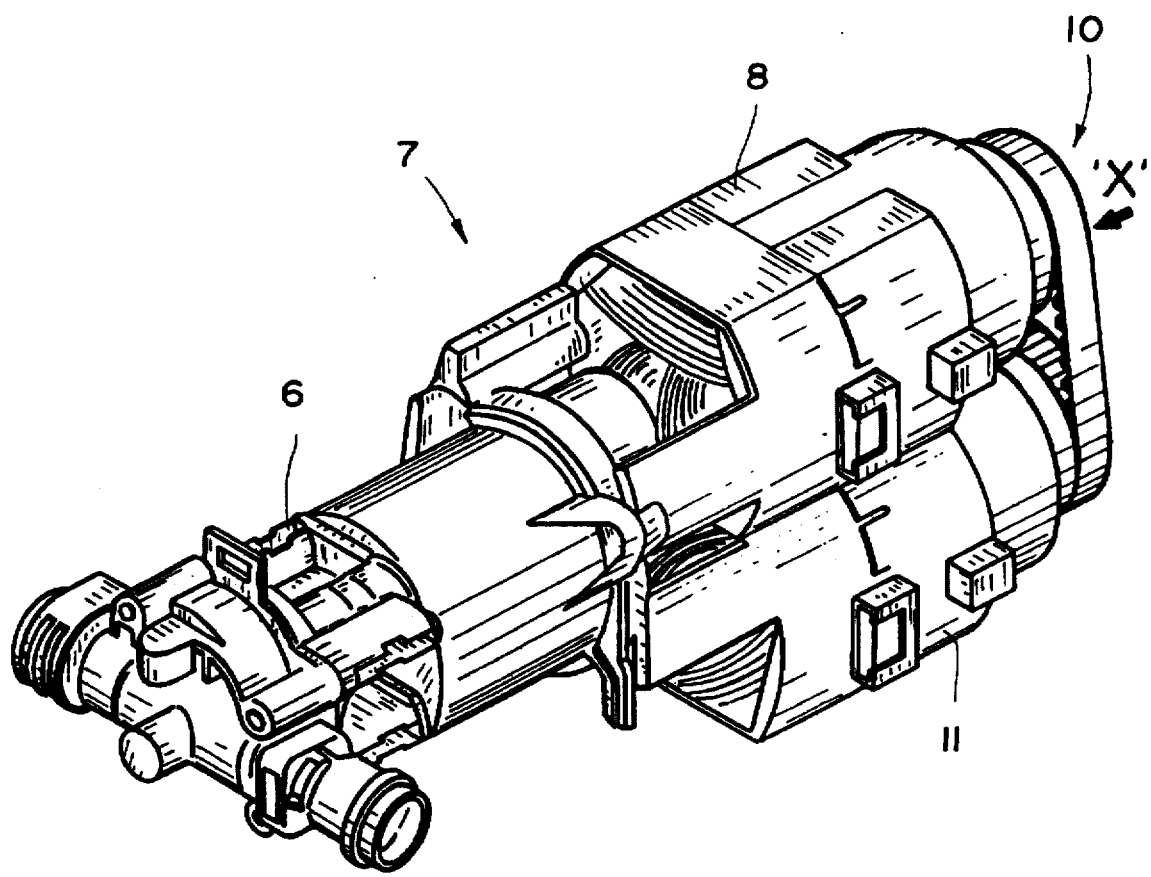
FIG. 2 is a perspective view of the "inner workings" of the high pressure cleaning means of FIG. 1.
Figure 3:
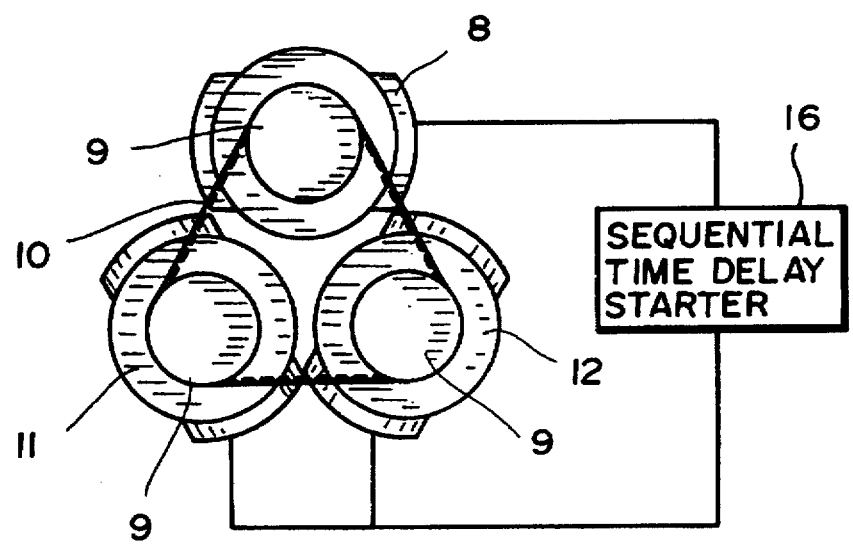
FIG. 3 shows the arrangement of FIG. 2 as seen when viewed in the direction of the arrow "X"

FIG. 2 shows the basically extremely simple concept of the invention. First, high pressure pump 6 with electric motor drive means 7 is apparent. The electric motor drive means 7 has an electric drive motor 8 with a drive shaft 9 (FIG. 3) that is connected to high pressure pump 6. At this point it is important that drive means 7 has at least a second electric drive motor 11. In the embodiment shown, this drive means, as shown in FIG. 3, has two more electric drive motors 11, 12, i.e., a total of three electric drive motors 8, 11, 12 exists. A transmission 10, such as a toothed drive belt, couples the drive shafts 9 of the motors 8, 11, 12 together.

Figure 5:
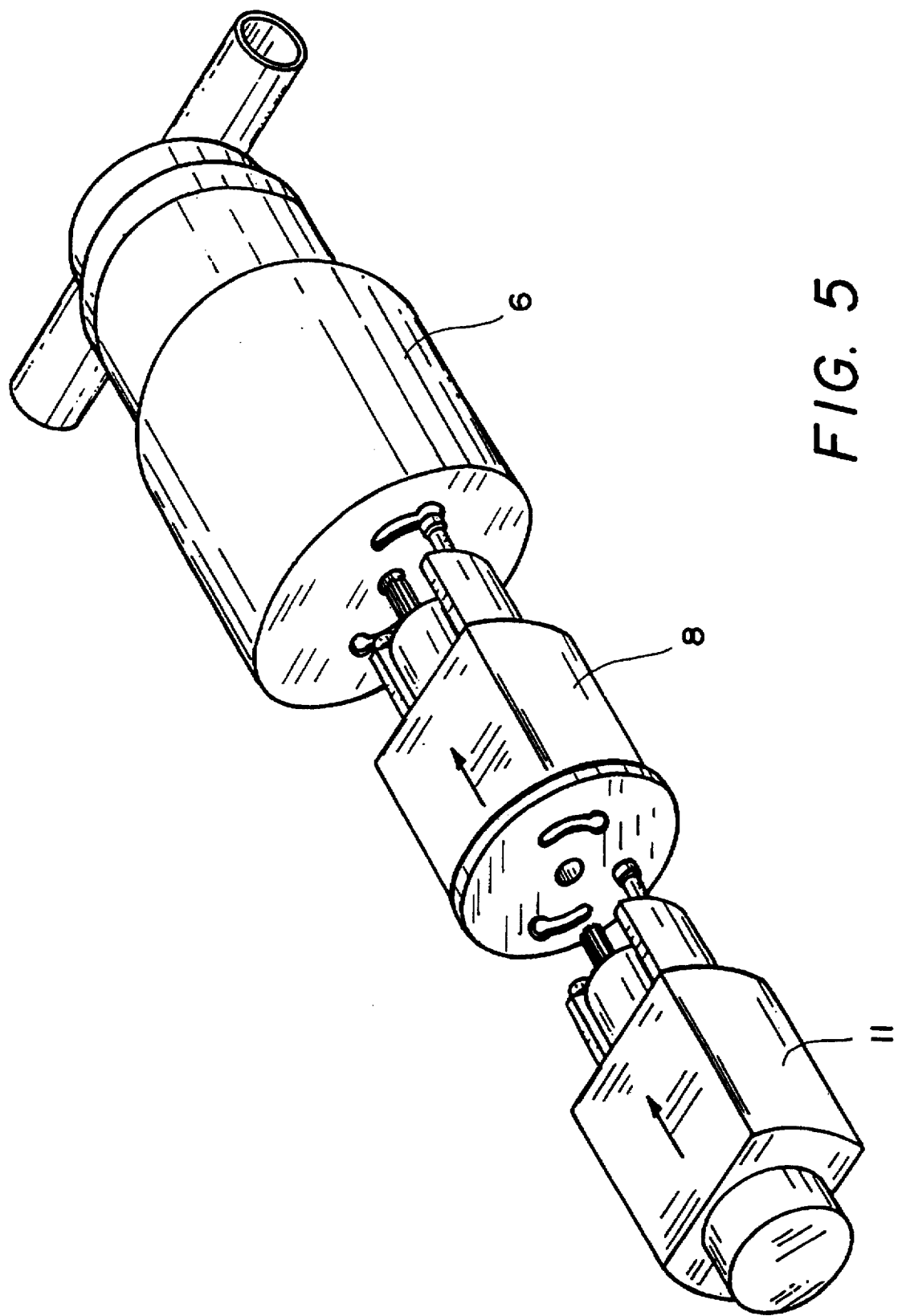
FIG. 5 shows an embodiment with a tandem electric drive motor arrangement.

FIG. 5 shows a modified arrangement of considerable importance with only two electric motors drive 8, 11. In this arrangement, two electric drive motors 8, 11 are connected in tandem; however, such a tandem arrangement could be applied to three motors as well.

In all embodiments, it is of considerable importance that all of electric motors 8, 11, and if present, 12 of drive means 7 are coupled to one another and drive high pressure pump 6 jointly. This can be accomplished most simply by connecting electric motors 8, 11, 12 in series so that drive shafts 9 are directly in secession and are directly interconnected (FIG. 5). Essentially they effectively constitute a single, continuous drive shaft 9. In doing so, transmission 10 can be formed, in the conventional manner, as a reducing gear located between drive shaft 9 of the frontmost electric motor 8 and high pressure pump 6.

Electric motors 8, 11, 12 can also be coupled to one another via the transmission 10, as shown and described with respect to FIGS. 2, 3, to drive high pressure pump 6 jointly by the drive shafts 9 of the electric motors 8, 11, 12 being coupled to one another via the toothed belt type transmission 10, with only one of the drive shafts 9, e.g., drive shaft 9 of upper drive electric motor 8, being coupled to high pressure pump 6. The other two drive shafts 9 are coupled via the transmission 10, i.e., the toothed belt, to the drive shaft 9 of the first drive electric motor and transmit their force by means of the toothed belt to this drive shaft 9 and thus to high pressure pump 6.

Figure 4:
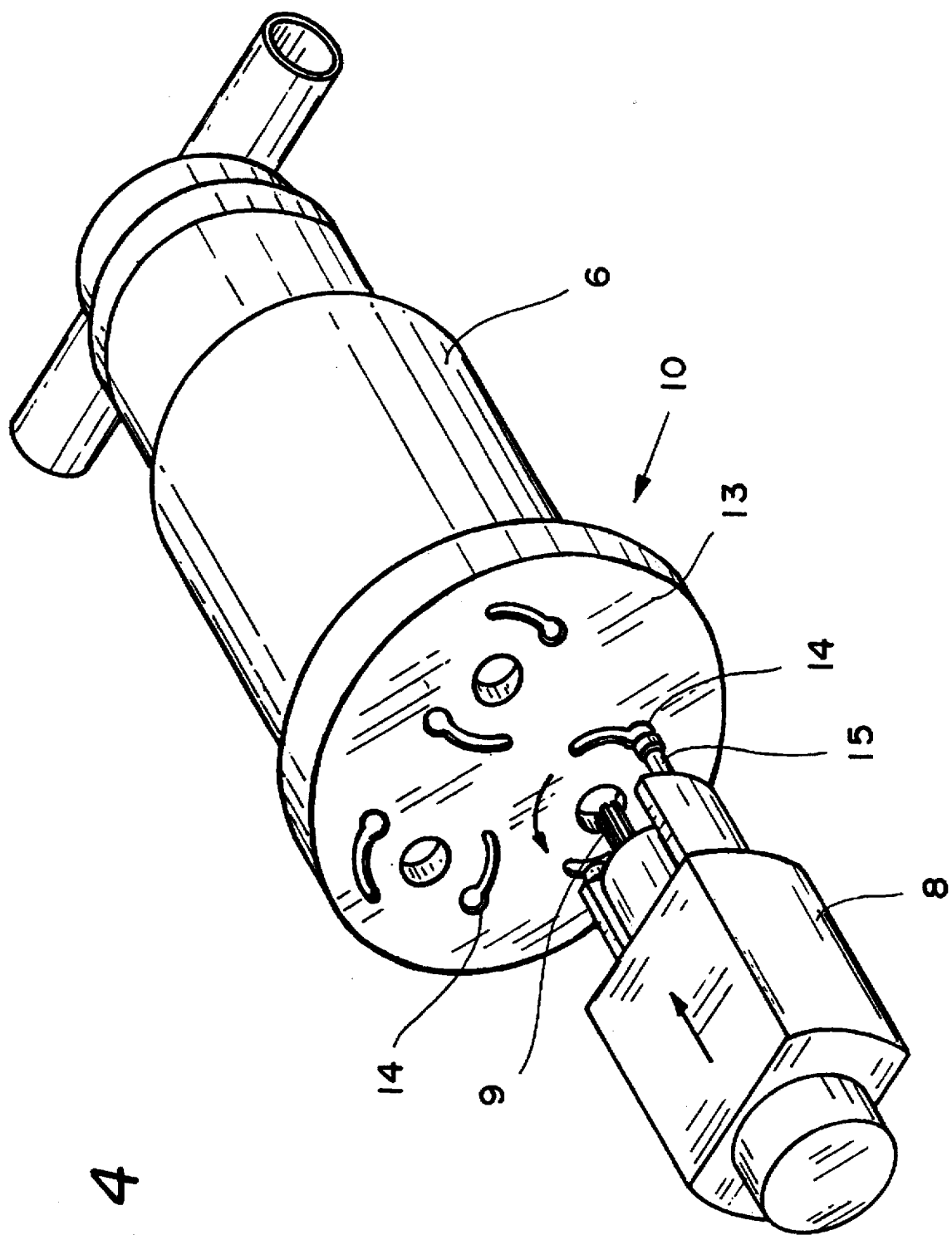
FIG. 4 shows another embodiment of an arrangement according to the invention enabling from one to three motors to be coupled to each other and to the high pressure pump via a transmission.

One alternative which would be preferable, possible for example in the embodiment according to FIG. 4, consists in the drive shafts 9 of electric motors 8, 11, 12 being coupled to one another and to high pressure pump 6 via transmission 10, especially a toothed belt transmission, and preferably a planetary gear. A planetary gear is especially well suited for such a concept.

The embodiment shown in FIG. 4, furthermore, provides a special flexibility in that, depending on the application, one, two, or three drive electric motors 8, 11, 12 can be coupled to a single high pressure pump 6. To do this, it is provided that transmission 10 has a carrier plate 13 with attachment points 14 for electric motors 8, 11, 12. Each of the electric motors 8, 11, 12 can be attached to carrier plate 13 and can thus be drive-coupled to transmission 10. In the embodiment shown it is furthermore provided that attachment points 14 are executed as bayonet collars into which bayonet projections 15 on electric motors 8, 11, 12 fit. The straight and curved arrows indicates how drive electric motor 8 is clipped onto carrier plate 13 at attachment points 14. By inserting the motor in the direction of the straight arrow, the end of drive shaft 9 of the electric drive motor, which is designed as a gear wheel, is automatically coupled to the gearing of the transmission 10. Then by turning the motor in the direction of the curved arrow, the electric motor 8 is attached to the carrier plate 13 by the bayonet coupling arrangement shown.

The teaching of the invention acquires special importance by the further step of executing electric motors 8, 11, 12 as universal motors (collector motors). In fact, it is such that two universal motors of half power together cost half as much as a single universal motor with twice the power. This not only reduces size, but also cuts costs dramatically due, on the one hand, to the fact that small universal motors can be produced especially cost-favorably, and on the other hand, that universal motors of a certain power are produced in especially large numbers which then naturally result in low costs. With the concept according to the invention, by the corresponding division of the necessary drive power, it is possible to reach exactly the motor power at which the universal motors to be used are especially cost favorable. Furthermore, universal motors have the advantages already described above, i.e., of being efficiently versatile and enabling especially simple rpm control.

Of special importance is another embodiment of the invention which is characterized in that there is a starting control (16 in FIG. 3) for electric motors 8, 11, 12 and electric motors 8, 11, 12 begin to start in succession with a suitable time delay when the high pressure cleaning means is turned on by the starting control. By means of the starting control designed in this manner, the current peaks in start-up can be reduced, such that the full power supply of the system can be used, since starting current need only ever be provided for one of the electric motors 8, 11, 12. The starting current of the second and third electric motors hardly counts here since they can be entrained by first electric motor 8. This means that, ultimately, the full nominal current protection of the system can be used; this represents a quite considerable advantage over high pressure cleaning means to date. Here as well universal motors are again optimum.

It is also advantageous in universal motors that the rpm can be controlled very easily, specifically by controlling the rpm of electric motors 8, 11, 12 via a phase angle circuit.

With regard to the above explanation of the overall concept of the invention, it should still be pointed out that hand saws, water pumps, shredders, vacuums (wet/dry vacuums, leaf vacuums) and various other assemblies which can be feasibly used in the household and in the commercial domain can be optimized according to the same system.

I claim:

1. High pressure cleaning means with a housing having a high pressure pump and having an electric motor drive means for the high pressure pump, said electric motor drive means comprising an electric drive motor having a drive shaft connected to the high pressure pump; wherein the drive means has at least a second electric drive motor; and wherein all of the electric drive motors of the drive means are coupled to one another in a manner driving the high pressure pump jointly; further comprising a starting control for the electric motors, said starting control having time delay means for starting the electric motors in succession when the high pressure cleaning means is turned on.

2. High pressure cleaning means according to claim 1, wherein the electric drive motors are coupled directly in series and only the drive shaft of a frontmost one of the electric drive motors is coupled to high pressure pump.

3. High pressure cleaning means according to claim 1, further comprising a transmission; and wherein all electric drive motors of the drive means are coupled to one another via said transmission.

4. High pressure cleaning means according to claim 3, wherein said transmission is a toothed belt transmission, and wherein only the drive shaft of one of the motors is coupled to the high pressure pump.

5. High pressure cleaning means according to claim 3, wherein drive shafts of the electric motors are coupled to one another and to the high pressure pump via said transmission; and wherein said transmission comprises a toothed gearing.

6. High pressure cleaning means according to claim 1, wherein the electric motors are universal motors.

7. High pressure cleaning means according to claim 2, wherein electric motors are universal motors.

8. High pressure cleaning means according to claim 1, wherein a phase angle circuit is provided for controlling the rpm of the electric motors.

9. High pressure cleaning means with a housing having a high pressure pump and having an electric motor drive means for the high pressure pump, said electric motor drive means comprising an electric drive motor having a drive shaft connected to the high pressure pump; wherein the drive means has at least a second electric drive motor; wherein all of the electric drive motors of the drive means are coupled to one another in a manner driving the high pressure pump jointly; wherein drive shafts of the electric motors are coupled to one another and to the high pressure pump via said transmission; wherein said transmission comprises a toothed gearing; and wherein the transmission has a carrier plate with attachment points for the electric motors; and wherein each electric motor is attached to the carrier plate and is drivingly coupled to the transmission.

10. High pressure cleaning means according to claim 9, wherein the attachment points are formed as bayonet collars into which bayonet projections on the electric motors fit.

11. High pressure cleaning means according to claim 9, further comprising a starting control for the electric motors, said starting control having time delay means for starting the electric motors in succession when the high pressure cleaning means is turned on.

12. Water pump assembly with a feed pump, and having an electric motor drive means for the feed pump, said electric motor drive means comprising an electric drive motor having a drive shaft connected to the feed pump; wherein the drive means has at least a second electric drive motor; and wherein all of the electric drive motors of the drive means are coupled to one another in a manner driving the feed pump jointly; further comprising a starting control for the electric motors, said starting control having time delay means for starting the electric motors in succession when the high pressure cleaning means is turned on.

13. Water pump assembly according to claim 12, wherein the electric drive motors are coupled directly in series and only the drive shaft of a frontmost one of the electric drive motors is coupled to the feed pump.

14. Water pump assembly according to claim 12, further comprising a transmission; and wherein all electric drive motors of the drive means are coupled to one another via said transmission.

* * * * *